US012802915B2

(12) United States Patent
Herrmann et al.

(10) Patent No.: US 12,802,915 B2
(45) Date of Patent: Nov. 17, 2026

(54) RELAY SWITCH

(71) Applicant: JOHNSON ELECTRIC GERMANY GMBH & CO. KG, Dresden (DE)

(72) Inventors: Marcus Herrmann, Dresden (DE); Felix Schneider, Dresden (DE); Daniel Sprungk, Dresden (DE)

(73) Assignee: JOHNSON ELECTRIC GERMANY GMBH & CO. KG, Dresden (DE)

( * ) Notice: Subject to any disclaimer, the term of this patent is extended or adjusted under 35 U.S.C. 154(b) by 273 days.

(21) Appl. No.: 18/575,768

(22) PCT Filed: Feb. 1, 2022

(86) PCT No.: PCT/EP2022/052369
§ 371 (c)(1),
(2) Date: Dec. 29, 2023

(87) PCT Pub. No.: WO2023/147847
PCT Pub. Date: Aug. 10, 2023

(65) Prior Publication Data

US 2024/0312748 A1 Sep. 19, 2024

(51) Int. Cl.
*H01H 50/54* (2006.01)
*H01H 50/58* (2006.01)

(52) U.S. Cl.
CPC .......... *H01H 50/546* (2013.01); *H01H 50/58* (2013.01)

(58) Field of Classification Search
CPC ........ H01H 50/546; H01H 50/58; H01H 1/62; H01H 1/02; H01H 50/20
USPC .......................................................... 335/106
See application file for complete search history.

(56) References Cited

U.S. PATENT DOCUMENTS 7,833,034 B2 * 11/2010 Connell .................. H01H 1/54 439/251
9,136,068 B2 * 9/2015 Connell ............... H01H 50/546
9,484,172 B2 * 11/2016 Connell ................ H01H 50/14
2015/0015349 A1 * 1/2015 Connell ................ H01H 3/001 335/15

FOREIGN PATENT DOCUMENTS

EP 2613332 A1 7/2013
WO 2017167212 A1 10/2017

OTHER PUBLICATIONS

Canadian Examiner's Requisition dated Jan. 28, 2025.
International Search Report from corresponding PCT Application No. PCT/EP2022/052369 Sep. 29, 2022.

* cited by examiner

*Primary Examiner* — Shawki S Ismail
*Assistant Examiner* — Lisa N Homza
(74) *Attorney, Agent, or Firm* — Aird & Berlis LLP

(57) ABSTRACT

A relay switch (42) for a relay (10) is provided which comprises a first terminal (14*a*, 14*b*), a second terminal (16*a*, 16*b*), and a switching arm arrangement (36) between the first and second terminals (14*a*, 14*b*, 16*a*, 16*b*) which forms a first electrical conduction pathway in a contact condition of the switching arm arrangement (36). An electrical conductor (49) is also arranged between the first and second terminals (14*a*, 14*b*, 16*a*, 16*b*) which forms a second electrical conduction pathway in the contact condition in parallel to the first electrical conduction pathway.

10 Claims, 3 Drawing Sheets

RELAY SWITCH

CROSS-REFERENCE TO RELATED APPLICATIONS

This application is the U.S. National Phase Application under 35 U.S.C. § 371 of International Patent Application No. PCT/EP2022/052369 filed on Jan. 1, 2022. The disclosure of the aforementioned application is hereby incorporated by reference in its entirety.

FIELD

The present invention relates to a relay switch for a relay, particularly but not necessarily exclusively for a two-pole relay of the type used in electricity meters. The invention further relates to a relay having such a relay switch.

BACKGROUND

Relays are used to provide connection and disconnection functionality, for example within electricity metering applications. In the US electricity distribution market, the two-pole relay is the most common arrangement, with each service disconnect switch associated with the respective pole comprises a single conductive path between terminals. Each pole or contact system will typically comprise 1 to 4 pairs of contacts, and may carry around 200 A continuously.

On switching there is a significant local heat rise in the contact area, since the contact points account for in excess of 75% of the total resistance of the switch. This heat cannot be readily dissipated, which can lead to excessive heat rise at the busbars of the terminals. In particular, where excessive heat rise occurs, this can lead to fail meeting relevant temperature rise standards which are required for meters, such as the UL2735 or ANSI C12 series, or meter adapters such as UL414. This is prohibitive for using such relays in micro-grid scenarios, such as in residential solar systems. At present, if there is any failure on the main grid, the user's solar power will only be usable by expensive, very large and difficult to install transfer switches, but there is no safe mechanism for disconnection of the local micro-grid by cost effective, small size and easy to install safe relay options.

SUMMARY

It is an object of the present invention to obviate or overcome the above-referenced problems of using meter adapter with relays instead of transfer switches by reducing the excessive heat rise which occurs at the terminals.

According to a first aspect of the invention, there is provided a relay switch for a relay, the relay switch comprising: a first terminal; a second terminal; a switching arm arrangement between the first and second terminals which forms a first electrical conduction pathway in a contact condition of the switching arm arrangement and which breaks the first electrical conduction pathway in a non-contact condition of the switching arm arrangement; and an electrical conductor arranged between the first and second terminals which forms a second electrical conduction pathway in the contact condition in parallel to the first electrical conduction pathway.

The provision of parallel electrical conduction pathways helps to spread the current load passing through the relay switch on contact closure. This helps to reduce the thermal load on the junction point between the switching arm arrangement and the first terminal, since a second point of thermal load is provided to share the heating effect at a point spaced apart from the junction point between the switching arm arrangement and the first terminal. Degradation of the relay due to heating effects is significantly reduced, whilst also maintaining good short circuit behaviour.

Preferably, the switching arm arrangement may comprise a pair of movable contact arms.

Movable contact arms have many advantages in the art which allow for simple contact action. However, the relatively thin contact arms are prone to heating easily, and therefore the present invention is highly suited for use with such contact arms to mitigate the heating effects.

Optionally, the electrical conductor may comprise a further switching arm arrangement.

The provision of a secondary switching arm arrangement which is positioned in parallel to the primary switching arrangement, both physically and electrically, makes actuation of both switching arm arrangements straightforward, and thus can limit the overall size of the relay. This may improve the ease with which a relay can be integrated into existing meter adapters.

The further switching arm arrangement may preferably comprise a pair of movable contact arms.

If a secondary pair of moveable arms is provided, then not only is there a thermal improvement at the junction points of the moveable arms with the first terminal, but also there is a sharing of the contact capacity on contact closure. This can reduce arcing damage through the respective sets of contacts.

Optionally, the or the further switching arm arrangement may comprise a lead contact arm and a lag contact arm.

A lead lag arrangement of the switching arm arrangement means that the lead contact can be configured to be much larger and more durable, with the lag contact then requiring less material to manufacture. This can reduce the cost of the manufacture of the relay.

The switching arm arrangement may be connected to the second terminal via a thermally conductive coupling.

Preferably, the thermally conductive coupling may be a rivet, a brazed joint, or a welded joint.

The intention of the present invention is to permit dissipation of the thermal load on contact closure, and therefore a suitable thermal pathway is helpful here.

In one embodiment, the further switching arm arrangement may be connected to the second terminal via a thermally conductive coupling.

Preferably, the thermally conductive coupling is a rivet, a brazed joint, or a welded joint.

Given that the further switching arm arrangement is designed to assist with the dissipation of the thermal load, it is not only helpful for the joint to be thermally conductive, but it is also useful for the joint to be of the same type as that of the first said switching arm arrangement.

Optionally, the first terminal may comprise a first busbar and a first terminal spur, the second terminal comprises a second busbar and a second terminal spur, the said switching arm arrangement extending between the first and second busbars, and the further switching arm arrangement extending between the first and second terminal spurs.

In a traditional two-pole relay, each terminal will extend into a busbar, which then either connects to the contact arm or the corresponding contacts. In the present arrangement, the provision of a laterally-spaced apart terminal spur provides a suitable parallelised electrical pathway to be formed which allows for the reduction in current load through each branch. This in turn reduces the heating effect, and the spacing apart of the spurs from the main contact point of the busbars ensures that the thermal overlap is minimised.

In one alternative embodiment, the switching arm arrangement may comprise a first movable contact arm and a second movable contact arm, the electrical conductor being coupled between the first movable contact arm and/or the second movable contact arm and the second terminal to form the second electrical conduction pathway. Said electrical conductor may be a braided wire conductor.

Thermal pathways which are not formed by a separate switching arrangement may be feasible, in particular, those which improve the thermal load through an existing part of a switching arm. This would preferably be the lead contact arm in any arrangement, given that the majority of the heating will occur through this pathway.

According to a second aspect of the invention, there is provided a relay comprising: a relay switch in accordance with the first aspect of the invention; and an actuator to drive the switching arm arrangement of the relay switch between an open condition and a closed condition.

A compact, thermally-efficient relay can be constructed using the relay switches as previously described.

Preferably, the relay may be a multi-pole relay comprising a plurality of said relay switches.

Since the present invention can meet thermal standards which cannot otherwise be achieved in existing two-pole relays, it will be apparent that integration of the invention into multi-pole relay technology will be viable.

The actuator may be configured to drive the switching arm arrangements of the relay switches synchronously with one another.

Synchronous driving will help to ensure that the current load and thus thermal share is equal across both parallel electrical conduction pathways at all times.

Preferably, the actuator may be a linear actuator having a plurality of wedge elements for driving the switching arm arrangements. Alternatively, rotary actuators with transformation gears may be a choice to drive the switching arm arrangements as an alternative.

Wedge members which all move in tandem with one another to engage with linearly aligned moveable arms provide a simple means for allowing the synchronous control of the contacting without drastically increasing the volumetric requirement of the relay housing.

According to a third aspect of the invention, there is provided a meter adapter comprising a relay in accordance with the second aspect of the invention.

According to a fourth aspect of the invention there is provided an electrical micro-grid comprising a meter adapter in accordance with the third aspect of the invention.

The present arrangement meets the thermal rise conditions which are detailed in standard UL414 for meter sockets, which allows for integration of disconnect relays in a much wider array of settings. For instance, local solar or other renewable energy sources, particularly those in residential or rural locations, can be disconnected from the wider grid so that the location can continue to be powered based on the renewable energy source or distributed energy source, even in the event of large-scale grid shutdown.

BRIEF DESCRIPTION OF THE DRAWING

The invention will now be more particularly described, by way of example only, with reference to the accompanying drawings, in which.

DETAILED DESCRIPTION OF THE PREFERRED EMBODIMENTS

Figure 1:
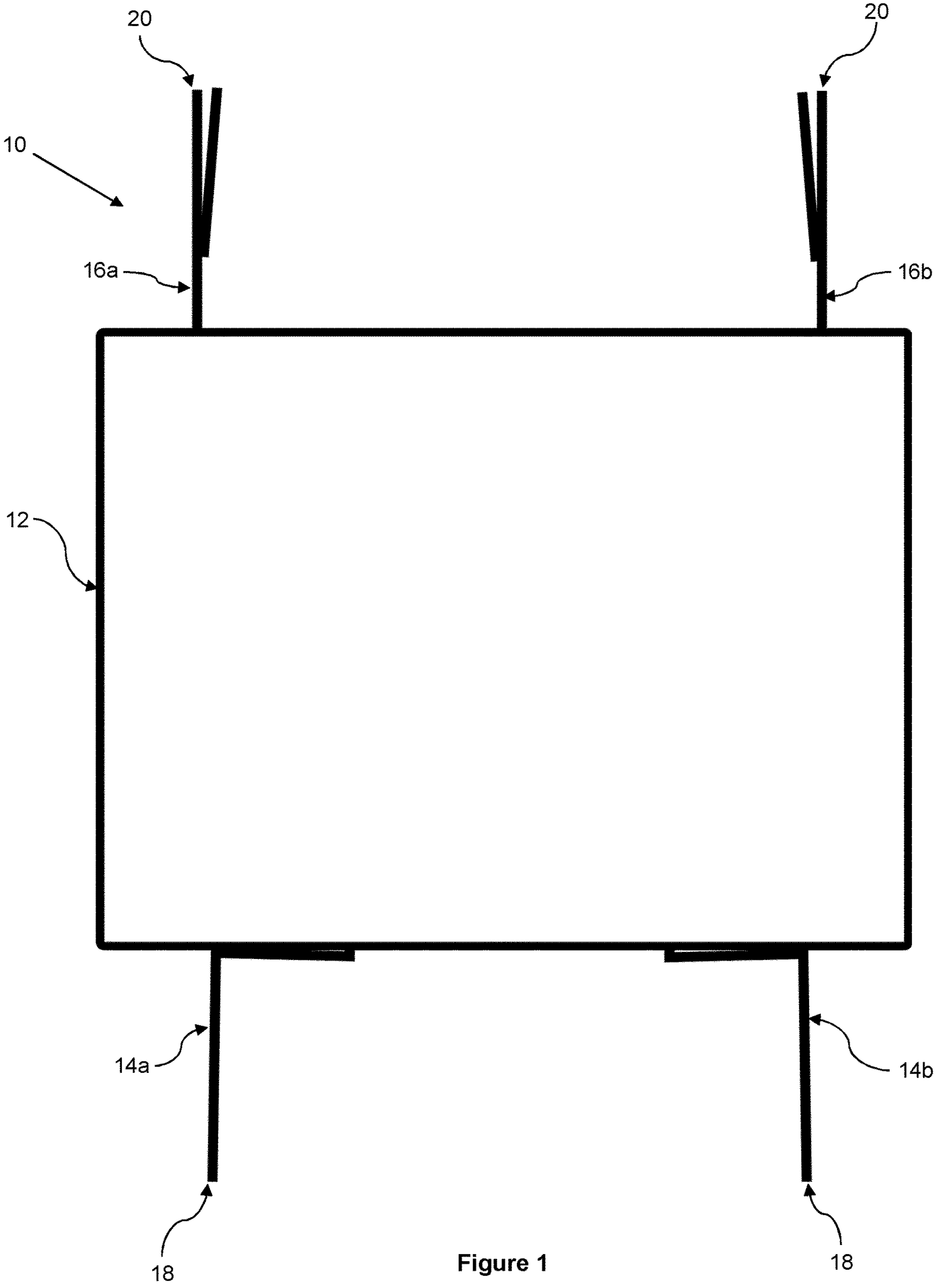
FIG. 1 shows a diagrammatic plan representation of a first embodiment of a relay in accordance with the second aspect of the invention.

Referring to FIG. 1, there is illustrated a two-pole relay, referenced globally at 10, which is suitable for as part of a meter adapter for a meter, typically an electric meter. A two-pole relay 10 is illustrated, which is that of the type used in the United States, but three-pole relays can be formed in accordance with the present invention, which may be more suitable for Europe. Indeed, the present invention is applicable to a relay having any number of poles.

The two-pole relay 10 has a relay housing 12 which will typically be dimensioned to be received into an appropriate meter adapter, which places size constraints onto the two-pole relay 10.

The two poles of the relay 10 each include first terminals 14*a*, 14*b* extending from one side of the relay housing 12, and second terminals 16*a*, 16*b* extending from the opposite side of the relay housing 12. The first terminals 14*a*, 14*b* extend into stabs 18, which may be directly insertable into corresponding sprung receivers in the meter adapter or meter. The second terminals 16*a*, 16*b* extend into sprung or deformable conductive jaws 20 into which similar stab-type conductors of a meter or meter adapter will be insertable.

Figure 2:
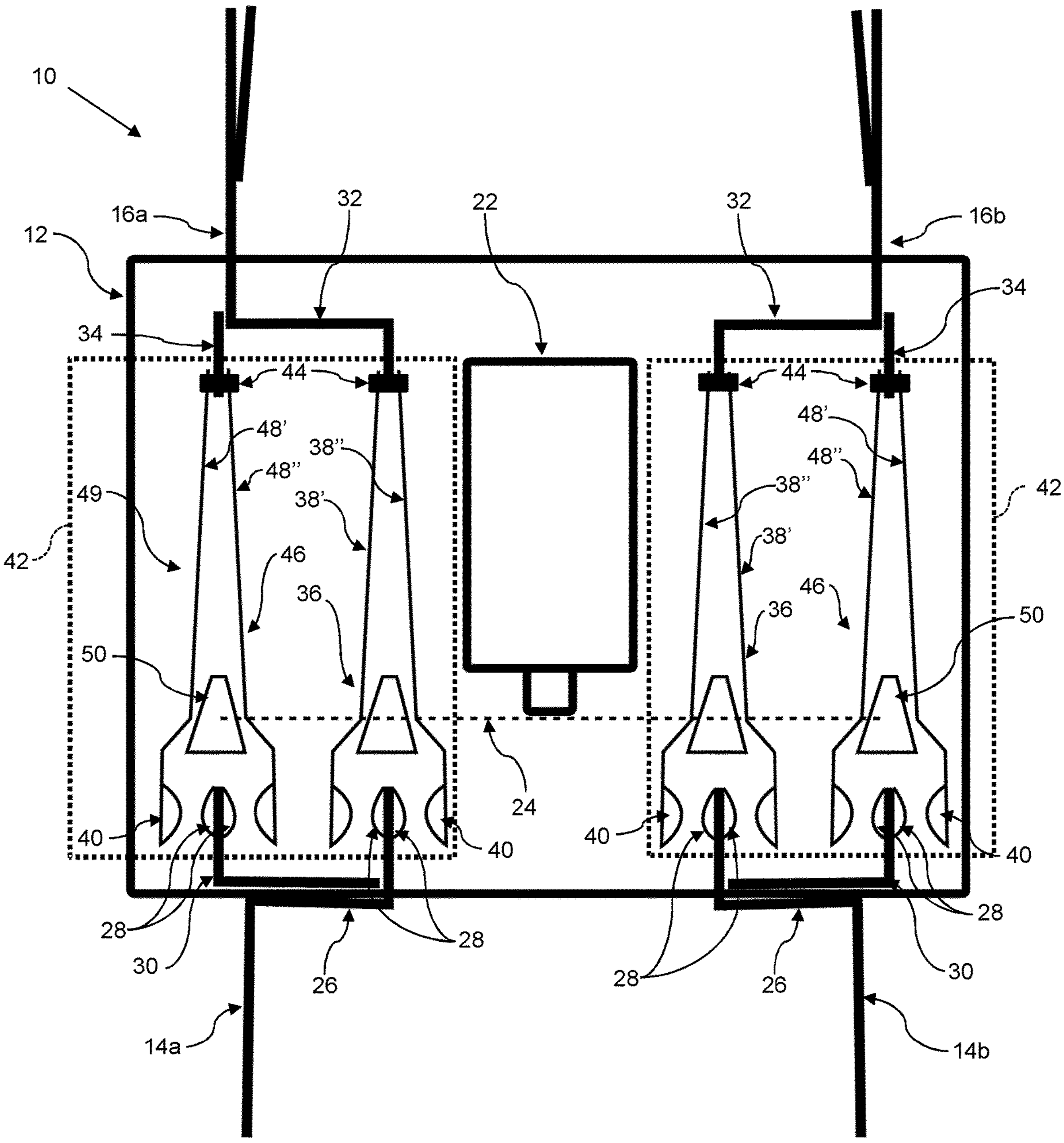
FIG. 2 shows a diagrammatic plan representation of the relay of FIG. 1 with a cover removed, comprising two relay switches in accordance with the first aspect of the invention.

FIG. 2 shows the interior of the two-pole relay 10. There is an actuator 22 positioned centrally within the relay housing 12 which drives a sliding member 24 to achieve a switching functionality.

Each pair of first and second terminals 14*a*, 14*b*, 16*a*, 16*b* has a switching arm arrangement therebetween, which allows for an electrical pathway to be formed from the respective first and second terminals 14*a*, 14*b*, 16*a*, 16*b*.

On one busbar 26 of each of the first terminals 14*a*, 14*b* is positioned at least one, and preferably a plurality of contacts 28. On a second branch or spur 30 of each of the first terminals 14*a*, 14*b* is positioned at least one, and preferably a plurality of further contacts 28.

The second terminals 16*a*, 16*b* may have a similar branching terminal structure, having a busbar 32 and a second branch or spur 34 which is connected to the busbar 32.

Extending from the busbar 32 of each second terminal 16*a*, 16*b* is a switching arm arrangement 36. This could comprise a single moveable arm, but in the illustrated embodiment, comprises a pair of moveable arms 38', 38", which may be configured as a lead-lag set of moveable arms.

Each moveable arm 38', 38" includes a contact 40 thereon which corresponds with one of the plurality of contacts 28 on the respective first terminal 14*a*, 14*b*. In a closed condition of each relay switch 42, indicated within the dashed boxes of FIG. 2, the contacts 28 of the first terminal 14*a*, 14*b* come into electrical contact with the contacts 40 of the moveable arms 38', 38".

The moveable arms 38', 38" are connected to the second terminal 16*a*, 16*b* via a thermally conductive coupling 44, which is illustrated as a rivet in the embodiment shown, but could equally be a brazed or welded joint.

Extending from the spur 34 of each second terminal 16*a*, 16*b* is a further switching arm arrangement 46. This could comprise a single moveable arm, but in the illustrated embodiment, comprises a pair of moveable arms 48', 48", which may be configured as a lead-lag set of moveable arms. It is preferred that the further switching arm arrangement 46 be identical to that of the said switching arm arrangement 36 in form, merely being spaced in parallel from the said switching arm arrangement 36. The further switching arm arrangement 46 therefore forms a parallel electrical conductor 49.

Each moveable arm 48', 48" includes a contact 40 thereon which corresponds with one of the plurality of contacts 28 on the respective spur 30 of the first terminal 14*a*, 14*b*. In a closed condition of each relay switch 42, the contacts 28 of the first terminal 14*a*, 14*b* come into electrical contact with the contacts 40 of the moveable arms 48', 48".

The moveable arms 48', 48" are connected to the second terminal 16*a*, 16*b* via a thermally conductive coupling 44, which is illustrated as a rivet in the embodiment shown, but could equally be a brazed or welded joint. The thermally conductive coupling 44 at the second spur 34 is therefore spaced apart from the thermally conductive coupling 44 at the second busbar 32. This spacing is in a lateral direction with respect to a direction of linear action of the actuator 22.

The further switching arm arrangement 46 creates a parallel conductive pathway to that through the first said switching arm arrangement 36 in the closed condition.

In use, the actuator 22 drives the sliding member 24 which has a plurality of wedge elements 50 thereon which contact with the moveable arms 38', 38", 48', 48". In a first condition of the actuator 22, the wedge elements 50 are urged into contact with the moveable arms 38', 38", 48', 48", pushing the moveable arms 38', 38", 48', 48" out of contact with the contacts 28 of the first terminal 14*a*, 14*b*. This creates a disconnect condition of the relay 10. Alternative actuator arrangements may be possible, of course, including but not limited to rotary actuators with transformation gears to drive the switching arm arrangements.

In a second condition of the actuator 22, the wedge elements 50 are pushed out of contact with the moveable arms 38', 38", 48', 48", and the contacts 40 come into contact with the contacts 28 of the first terminal 14*a*, 14*b*. This creates the contact condition of the relay 10. It is during contact closure upon entry into the second condition that the heating occurs.

Since the wedge elements 50 move both the switching arm arrangement 36 and further switching arm arrangement 46 synchronously, current is shared between the two parallel pathways respectively formed through the switching arm arrangement 36 and the further switching arm arrangement 46. Current is thus shared between the first busbar 26 and the first spur 30, and between the second busbar 32 and the second spur 34, and thus there is a sharing of the thermal load therebetween. Contact damage is therefore reduced.

Figure 3:
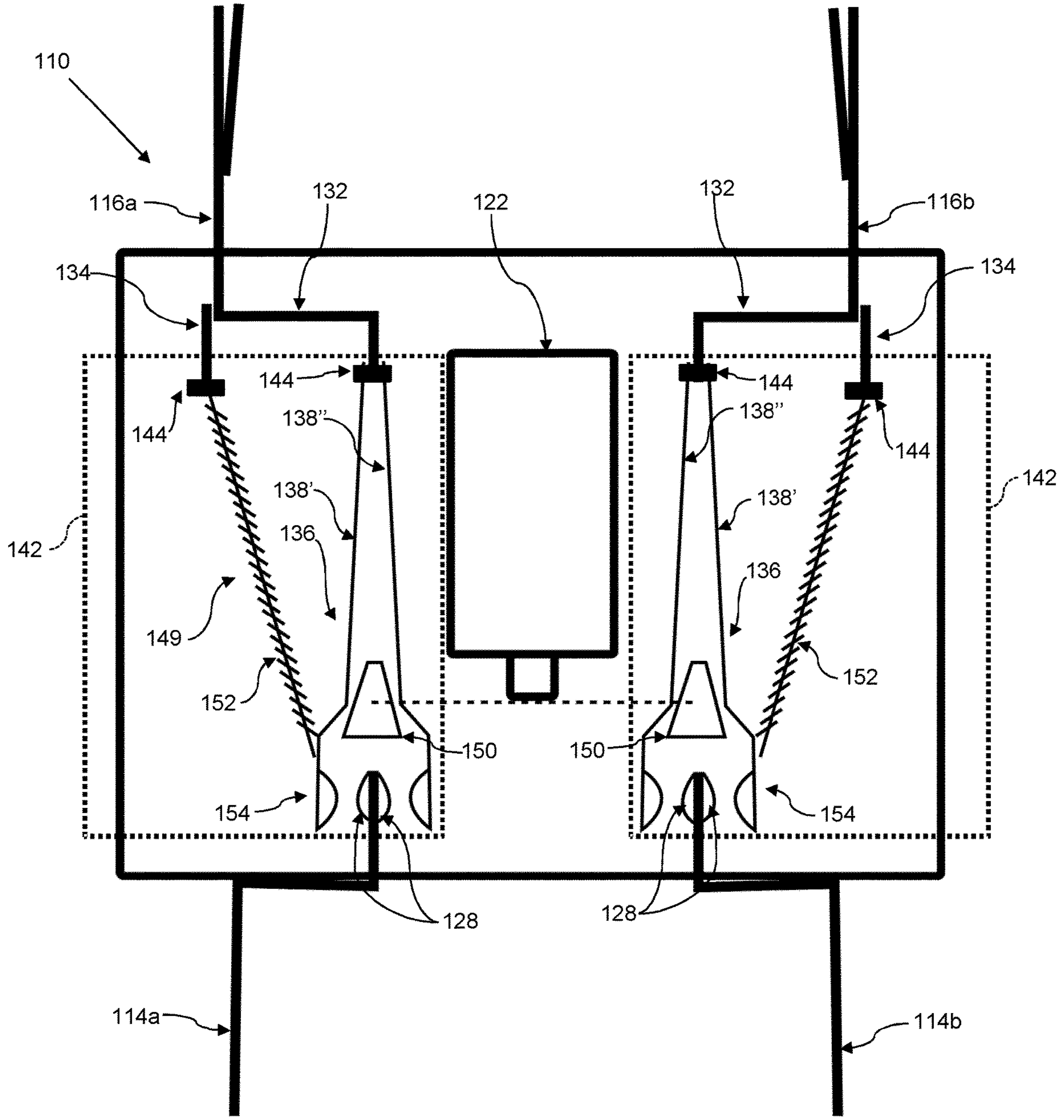
FIG. 3 shows a diagrammatic plan representation of a second embodiment of a relay in accordance with the second aspect of the invention, comprising two relay switches in accordance with the first aspect of the invention.

FIG. 3 shows a second embodiment of a relay, referenced globally at 110. Identical or similar features of the second embodiment will be referenced using identical or similar reference numerals, and further detailed description is omitted for brevity.

A two-pole relay 110 is once again illustrated by way of comparison with the first embodiment. The main switching arm arrangements 136 are provided extending between the busbar 132 of the second terminal 116*a*, 116*b* and the contacts 128 on the first terminal 114*a*, 114*b* via the moveable arms 138', 138". The moveable arms 138', 138" are again driven by the wedge elements 150 connected to the actuator 122.

However, in lieu of the second switching arm arrangement, there is provided an electrical conductor 149 in the form of a flexible conductor 152, such as a braided wire conductor, which is coupled to the terminal spur 134 of the second terminal 116*a*, 116*b* via a thermally-conductive coupling 144 such as a rivet, brazed joint, or welded joint. The flexible conductor 152 extends to a head end 154 of one of the moveable arms 138' of the switching arm arrangement, which would preferably be a lead contact arm, thereby forming the electrically parallel second electrical conduction pathway which is physically spaced apart from the first said electrical conduction pathway.

The flexible conductor 152 provides the additional electrical conduction pathway which spreads the current flow through the relay switch 142, indicated in the dashed boxes of FIG. 3, and thereby reduces heating effects on the second terminal 116*a*, 116*b* in much the same manner as for the first described embodiment of the invention.

It will be apparent that, for the relay switch 142 to function properly, that the electrical conductor must be capable of disconnecting, even if it is not provided as a switching arm arrangement. In the second embodiment, this is achieved by the direct coupling to one of the moveable arms 138', but it will be apparent that a separate switch function could be provided here for a flexible conductor 152 as well. Whilst having multiple contacts as in the first embodiment of the invention is preferred, the flexible conductor 152 still provides increased resistance and therefore thermal capacity.

It is noted that throughout the description, the term parallel has been used in electrical terms, that is, that the electrical pathways form parallel current paths. It is noted that in the first embodiment, the electrical pathways are physically parallel as well, but this need not necessarily be the case, as illustrated in the second embodiment of the invention.

It is therefore possible to provide an improved relay which can provide disconnect functionality in a wide variety of settings, due to the improved thermal dissipation characteristics of the relay switches therein. This is achieved by the use of the parallel electrical conduction within the relay relative to the standard switching arm arrangement which shares the current burden and by extension, heating effects. The relay can thus be configured to meet the guidance in UL414 for integration into meter adapters, and can be used to provide disconnect function in micro-grid scenarios.

The words 'comprises/comprising' and the words 'having/including' when used herein with reference to the present invention are used to specify the presence of stated features, integers, steps, or components, but do not preclude the presence or addition of one or more other features, integers, steps, components, or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A relay switch for a relay, the relay switch comprising:

a first terminal;

a second terminal;

a switching arm arrangement comprising a pair of movable contact arms between the first and second terminals which forms a first electrical conduction pathway in a contact condition of the switching arm arrangement and which breaks the first electrical conduction pathway in a non-contact condition of the switching arm arrangement; and an electrical conductor arranged between the first and second terminals which forms a second electrical conduction pathway in the contact condition in parallel to the first electrical conduction pathway, wherein the electrical conductor comprises a further switching arm arrangement, wherein the switching arm arrangement is connected to the second terminal via a thermally conductive coupling, wherein the further switching arm arrangement is connected to the second terminal via a thermally conductive coupling.

2. A relay switch as claimed in claim 1, wherein the further switching arm arrangement comprises a pair of movable contact arms.

3. A relay switch as claimed in claim 1, wherein the switching arm arrangement comprises a lead contact arm and a lag contact arm.

4. A relay switch as claimed in claim 1, wherein the first terminal comprises a first busbar and a first terminal spur, the second terminal comprises a second busbar and a second terminal spur, the said switching arm arrangement extending between the first and second busbars, and the further switching arm arrangement extending between the first and second terminal spurs.

5. A relay switch as claimed in claim 1, wherein the switching arm arrangement comprises a first movable contact arm and a second movable contact arm, the electrical conductor being coupled between the first movable contact arm and/or the second movable contact arm and the second terminal to form the second electrical conduction pathway.

6. A relay switch as claimed in claim 5, wherein the electrical conductor comprises a flexible conductor.

7. A relay comprising:

a relay switch as claimed in claim 1; and an actuator to drive a switching arm arrangement of the relay switch between an open condition and a closed condition, wherein the relay is a multi-pole relay comprising a plurality of said relay switches, wherein the actuator is a linear actuator having a plurality of wedge elements for driving the switching arm arrangements.

8. A relay as claimed in claim 7, wherein the actuator is configured to drive the switching arm arrangements of the relay switches synchronously with one another.

9. A meter adapter comprising a relay as claimed in claim 7.

10. An electrical micro-grid comprising a meter adapter as claimed in claim 9.

* * * * *